R. H. FLAKE.
NUT LOCK.
APPLICATION FILED AUG. 28, 1915.

1,183,966.  Patented May 23, 1916.

Witnesses
Philip E. Barnes
E. J. Sheehy

Inventor
R. H. Flake
By James J. Sheehy & Co.
Attorneys

THE COLUMBIA PLANOGRAPH CO., WASHINGTON, D. C.

UNITED STATES PATENT OFFICE.

RICHARD H. FLAKE, OF NEW ORLEANS, LOUISIANA.

NUT-LOCK.

1,183,966. Specification of Letters Patent. Patented May 23, 1916.

Application filed August 28, 1915. Serial No. 47,815.

*To all whom it may concern:*

Be it known that I, RICHARD H. FLAKE, a citizen of the United States, residing at New Orleans, in the parish of Orleans and State of Louisiana, have invented new and useful Improvements in Nut-Locks, of which the following is a specification.

My present invention pertains to nut locks; and it consists in the simple, easily-operated and efficient nut lock hereinafter described and definitely claimed.

Figure 1:
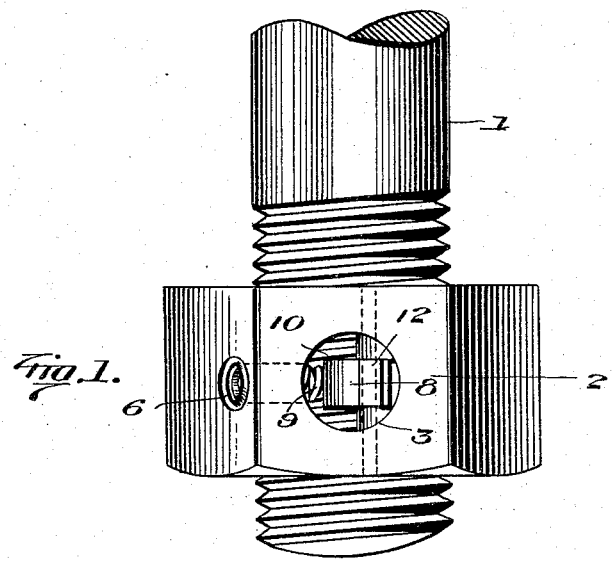
Figure 2:
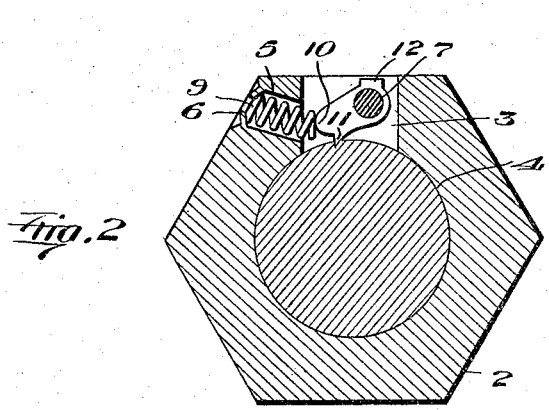
Figure 3:
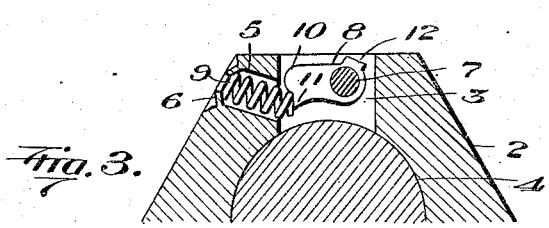

In the accompanying drawings, which are hereby made a part hereof: Figure 1 is a view showing in edge elevation a nut equipped with my improvement and mounted on a bolt. Fig. 2 is a cross-section taken through the bolt and nut and illustrating the dog comprised in my improvement in working position. Fig. 3 is a fragmentary section illustrating the dog in the position in which it is retained to permit of the nut being turned off the bolt without interference.

Similar numerals of reference designate corresponding parts in all of the views of the drawings.

The threaded bolt 1 is of conventional construction, and the nut 2 is also of well known type with the exception that it is provided with a chamber 3 in communication with the threaded bore 4 of the nut and a passage 5 which extends from the said chamber 3 to the edge of the nut and is provided adjacent to said edge with a contraction 6, designed to form an abutment, as hereinafter described.

Intersecting the chamber 3 is a pin 7, and loosely mounted on said pin is a dog 8, subject to the pressure of a compression spring 9 that is interposed between the dog and the abutment 6 as appears in Figs. 2 and 3. The dog 8 is provided with a rounded free end 10, and with a spur 11, disposed so as to rest adjacent the said rounded end 10 and between the same and the perimeter of the bolt on which the nut is mounted. It will also be observed that the dog is equipped with a protuberance 12, disposed at an angle to the comparatively large portion of the dog on which the spur 11 is carried. The said protuberance 12 is designed to bring up against the adjacent wall of the chamber 3 and in that way prevent the large portion of the dog being swung outwardly to such an extent that the dog is relieved of the pressure of the spring 9.

In the practical use of my improvement, the nut is turned on the bolt while the dog 8 is held in the position shown in Fig. 3 by the tendency of the spring 9 to expand, the said spring bearing at that time against the spur and serving to frictionally hold the dog in the idle position and against casual movement. When the nut is correctly positioned on the bolt, the major portion of the dog is moved inwardly, by pressure applied to the protuberance 12 or otherwise, whereupon the spring 9 will bear against the rounded end 10 of the dog and will assure the dog cutting into the bolt with a view to effectually preventing retrograde rotation of the nut. It will also be noticed in this connection that the greater the pressure exerted against the nut to turn it off the bolt, the more firmly will the spur 11 engage the bolt to prevent retrograde movement of the nut. When, however, it is desired to turn the nut off the bolt, the same can be readily accomplished after the dog is moved to the position shown in Fig. 3.

It will be manifest from the foregoing that to install my improvement in an ordinary nut, it is simply necessary as a condition precedent to provide the nut with a chamber 3 and a passage 5 in which is an abutment such as 6. It will also be manifest that notwithstanding its simplicity, my novel lock is highly efficient and reliable in operation.

Having described my invention, what I claim and desire to secure by Letters-Patent is:

1. In a nut lock, the combination of a bolt, a nut mounted on the bolt and having a chamber in communication with the bolt and also having a passage extending from said chamber to the nut edge and provided adjacent to said edge with a contraction forming an abutment, a transverse pin intersecting the chamber of the nut, a dog mounted on said pin and movable in said chamber and having a comparatively large portion on which is a rounded free end and a spur located between said end and the perimeter of the bolt and also having a protuberance disposed at an angle to said comparatively large portion and arranged to bring up against the adjacent wall of the chamber, and a compression spring disposed in said passage of the nut and interposed between said abutment and the comparatively large portion of the dog.

2. The combination of a nut having a threaded bore, a swinging dog mounted in the nut and having a rounded free end and also having a spur located between said rounded end and the bore of the nut, and a compression spring interposed between the dog and an abutment in the nut and constructed and arranged in one position to bear against the rounded end of the dog and in another position to bear against one side of the dog spur.

3. A nut having a threaded bore, a swinging dog mounted in the nut and having a bolt-engaging spur, and a spring also carried in the nut; said dog and spring being constructed and arranged to enable the spring in one position of the dog to press the dog spur inwardly, and in another position of the dog to hold the same against inward and other casual movement.

In testimony whereof I have hereunto set my hand in presence of two subscribing witnesses.

RICHARD H. FLAKE.

Witnesses:
F. FRUSHTHALER,
L. H. McCORMICK.

Copies of this patent may be obtained for five cents each, by addressing the "Commissioner of Patents, Washington, D. C."